United States Patent
Ancora et al.

(10) Patent No.: US 8,750,439 B2
(45) Date of Patent: Jun. 10, 2014

(54) PROCESS AND RECEIVER FOR INTERFERENCE CANCELLATION OF INTERFERING BASE STATIONS IN A SYNCHRONIZED OFDM SYSTEM

(75) Inventors: Andrea Ancora, Nice (FR); Fabrizio Tomatis, Saint-Laurent-du-Var (FR)

(73) Assignee: St-Ericsson SA, Plan-les-Ouates (CH)

( * ) Notice: Subject to any disclaimer, the term of this patent is extended or adjusted under 35 U.S.C. 154(b) by 329 days.

(21) Appl. No.: 13/143,036

(22) PCT Filed: Dec. 29, 2009

(86) PCT No.: PCT/EP2009/009314
§ 371 (c)(1),
(2), (4) Date: Oct. 3, 2011

(87) PCT Pub. No.: WO2010/076023
PCT Pub. Date: Jul. 8, 2010

(65) Prior Publication Data
US 2012/0027109 A1    Feb. 2, 2012

(30) Foreign Application Priority Data
Dec. 31, 2008  (EP) ..................... 08368027

(51) Int. Cl.
H04B 7/10 (2006.01)
(52) U.S. Cl.
USPC ........... 375/347; 375/259; 375/260; 375/316; 375/346
(58) Field of Classification Search
USPC .................. 375/347, 259, 260, 316, 346
See application file for complete search history.

(56) References Cited

U.S. PATENT DOCUMENTS

| | | | | |
|---|---|---|---|---|
| 7,035,359 B2* | 4/2006 | Molnar | .................... | 375/346 |
| 7,684,512 B2* | 3/2010 | Nagaraj | .................... | 375/295 |
| 8,467,466 B2* | 6/2013 | Bjerke et al. | .................. | 375/262 |
| 2002/0177447 A1* | 11/2002 | Walton et al. | .................. | 455/452 |
| 2003/0072258 A1* | 4/2003 | Tarokh et al. | .................. | 370/210 |
| 2004/0083082 A1* | 4/2004 | Onggosanusi et al. | ........... | 703/2 |
| 2006/0251156 A1* | 11/2006 | Grant et al. | .................... | 375/148 |
| 2006/0256843 A1* | 11/2006 | Grant et al. | .................... | 375/148 |

(Continued)

OTHER PUBLICATIONS

"Overcoming Interference in Spatial Multiplexing MIMO Cellular Networks"; IEEE Wireless Communications; vol. 14, No. 6; Dec. 1, 2007; pp. 95-104.

(Continued)

*Primary Examiner* — Kenneth Lam
(74) *Attorney, Agent, or Firm* — Howison & Arnott, L.L.P.

(57) ABSTRACT

A process and receiver for canceling interference generated by a set interference base stations in a synchronized OFDM communication system and receiver in a User Equipment comprising a set of Nrx antennas. The process and receiver that cancels interference generated by a set of base stations performs OFDM demodulation on a receiver signal for each antenna of a user equipment (UE). The process and receiver also monitors each UE antenna for pilot signals generated by nearby base stations. Then the process or receiver extracts the pilot signals and establishes a list of existing base station antennas. The channel power of any interfering antennas is measured and then the Nrx-N most powerful antenna is selected. The process or receiver then performs a joint detection of the N useful Data Symbols (UDS), together with the (Nrx-N) Interfering Data Symbols (IDS) that are demodulated by demodulation blocks. Thus, after being detected, the Nrx-N most powerful IDSs can be encoded and re-injected into a cancellation loop.

12 Claims, 5 Drawing Sheets

(56) References Cited

U.S. PATENT DOCUMENTS

| | | | |
|---|---|---|---|
| 2006/0274836 A1* | 12/2006 | Sampath et al. | 375/242 |
| 2007/0054621 A1* | 3/2007 | Larsson | 455/67.11 |
| 2008/0109701 A1* | 5/2008 | Yu et al. | 714/760 |
| 2009/0028324 A1* | 1/2009 | Eroz et al. | 380/28 |
| 2009/0304122 A1* | 12/2009 | Fatemi-Ghomi et al. | 375/341 |
| 2010/0098245 A1* | 4/2010 | Fang et al. | 380/38 |

OTHER PUBLICATIONS

Patent Cooperation Treaty International Search Report and Written Opinion for PCT/EP2009/009314; Jun. 2, 2010; 8 pages.

"Implementation and Experimental Results of a Three-Transmitter Three-Receiver OFDM/Blast Testbed"; IEEE Communication Magazine; Dec. 2004; 8 pages.

* cited by examiner

PROCESS AND RECEIVER FOR INTERFERENCE CANCELLATION OF INTERFERING BASE STATIONS IN A SYNCHRONIZED OFDM SYSTEM

CROSS-REFERENCE TO RELATED APPLICATIONS

This application is a U.S. National Phase application submitted under 35 U.S.C. §371 of Patent Cooperation Treaty application serial no. PCT/EP2009/009314, filed Dec. 29, 2009, and entitled PROCESS AND RECEIVER FOR INTERFERENCE CANCELLATION OF INTERFERING BASE STATIONS IN A SYNCHRONIZED OFDM SYSTEM, which application claims priority to European patent application serial no. EP 08368027.2, filed Dec. 13, 2008, and entitled PROCESS FOR INTERFERENCE CANCELLATION OF INTERFERING BASE STATIONS IN A SYNCHRONIZED OFDM SYSTEM, AND RECEIVER FOR THE SAME.

Patent Cooperation Treaty application serial no. PCT/EP2009/009314, published as WO 2010/076023, and European patent application serial no. EP 08368027.2, are incorporated herein by reference.

TECHNICAL FIELD

The invention relates to digital wireless communication and particularly for a process for canceling interference generated by interference base stations in a synchronized OFDM communication system and a receiver for the same.

BACKGROUND

Digital wireless communication is widely used throughout the world particularly with the latest development of the Orthogonal Frequency Division Multiplex (OFDM systems) and the last evolution, namely the so-called Long Term Evolution (LTE) systems.

With the advent of those new systems and the development of OFDM, the number of communicating cells and users will tremendously increase over one given area.

This will strongly increase the level of interference of the communications between the UEs and the Cells, and improved techniques will be required for canceling the interference resulting from a continuously increasing number of base stations.

SUMMARY

Embodiments of the invention may carry out a process for canceling the interference in a UE fitted with MIMO antennas.

Embodiments of the invention may also provide a process of interference cancellation for a synchronous OFDM cellular system based on the use of MIMO receivers.

Another embodiment of the invention may provide an effective interference cancellation process which is suitable for any synchronous OFDM system and particularly adapted to the Long Term Evolution (LTE) standard.

Further embodiments of the present invention carry out a receiver for a synchronous OFDM cellular system which achieves efficient OFDM receiving and interference cancellation of the present interfering base stations or antennas.

Those and other embodiments are achieved by means of a process for canceling the interference generated by a set interference base stations, which comprises the steps of:

performing an OFDM demodulation of the received signal for each antenna within the User Equipment;

monitoring, for each antenna within the UE, the pilot signals (for instance the Reference Signal in LTE or the more generic Broadcast Pilot Channel) generated by the present base stations;

extracting the detected pilot signals and establishes the list of the existing base stations antennas;

measuring the channel power of the interfering antennas;

selecting the Nrx-N most powerful channels;

performing a joint detection of the N Useful Data Symbols (UDS), together with the (Nrx-N) Interfering Data Symbols (IDS) demodulated by the demodulation blocks.

It has been observed that the joint detection of both useful data symbols (USD) and interfering data symbol (IDS) significantly increases the efficiency of the receiver and, therefore, the MIMO structure existing in the UE can be advantageously used for the purpose of interference cancellation.

In one embodiment the detected most powerful Interfering Data Symbols which are generated by the joint decoder are decoded before being re-encoded and introduced in an interference cancellation loop.

In one embodiment, the joint decoder is a sphere decoder. Alternatively, the joint decoder is a linear equalizer, or a maximum likelihood decoder.

The invention also provides with a receiver for a synchronous OFDM cellular system, which includes:

a set of Nrx OFDM demodulators associated to a set of Nrx antennas, said OFDM demodulators performing time and frequency synchronization, cyclic prefix discard and IFFT conversion of four data streams;

means for estimating the channels associated to the multiple signals received through said antennas from base stations belonging to said OFDM cellular system;

a joint decoder for decoding the Nrx demodulated OFDM symbol;

means for measuring the channel power corresponding to all the interfering base stations and base station antennas; and means for controlling said joint decoder in order to perform joint detection of N useful data stream and the N-Nrx most powerful interference data streams.

In one embodiment, the receiver further includes re-encoding means for re-generating the OFDM symbol of the detected interference data streams so as to perform interference cancellation.

The invention is particularly useful for carrying out an UE fitted with a receiving complying with the future LTE standard.

BRIEF DESCRIPTION OF THE DRAWINGS

Other features of one or more embodiments of the invention will best be understood by reference to the following detailed description when read in conjunction with the accompanying drawings.

DETAILED DESCRIPTION

There will now be described how one can significantly improve the cancellation of the interference generated by the multiple communications established in a synchronous OFDM communication system, comprising a set of base stations or cells, at least one communicating with one user equipment (UE).

The invention will be particularly described in relation with the Long Term Evolution (LTE) standard which is the next step of the evolution of digital wireless communications, but it should be clear that this is only one particular embodiment and application of the invention and the invention may be used in any cellular system based on a OFDM modulation with synchronous cells or base stations. Indeed, the OFDM modulation is widely spread in many existing standards (such as DAB, DVB-T, WiMAX, IEEE 802.16, ADSL, WLAN IEEE 802.11a/g, etc.) and expected to be used in many future developing standards. As known by the skilled man, the OFDM converts a broadband frequency-selective channel into a multiplicity of parallel narrow-band single channels. This is achieved by means of the insertion of a guard interval (so-called Cyclic Prefix CP) between the individual symbols, as shown in FIG. 1B. Such a guard interval is assumed to be temporally long enough to compensate for jitter, i.e., the variation of the delays experienced by the transmitted OFDM symbols through the channel. This prevents the appearance of inter-symbol interference (ISI) which can thus be prevented.

In addition, the OFDM technique can be advantageously combined with the use of multiple antennas on the sending side as well as the receiving side to increase diversity gain and/or transmission capacity in time-varying and frequency-selective channels.

Further information may be found in the following reference "*Implementation and Experimental Results of a Three-Transmitter Three-Receiver OFDM/BLAST Testbed*", by Xiang, Waters, Bratt, Barry, Walkenhorst, IEEE Communication Magazine 2004.

Since the OFDM communication system is also presumed to be synchronous, the OFDM symbols which are exchanged with the base stations are also synchronous.

It should thus be noticed that the invention which will be disclosed below is likely to be used in a wide range of applications and should not be limited to the sole use of LTE.

Figure 1A:
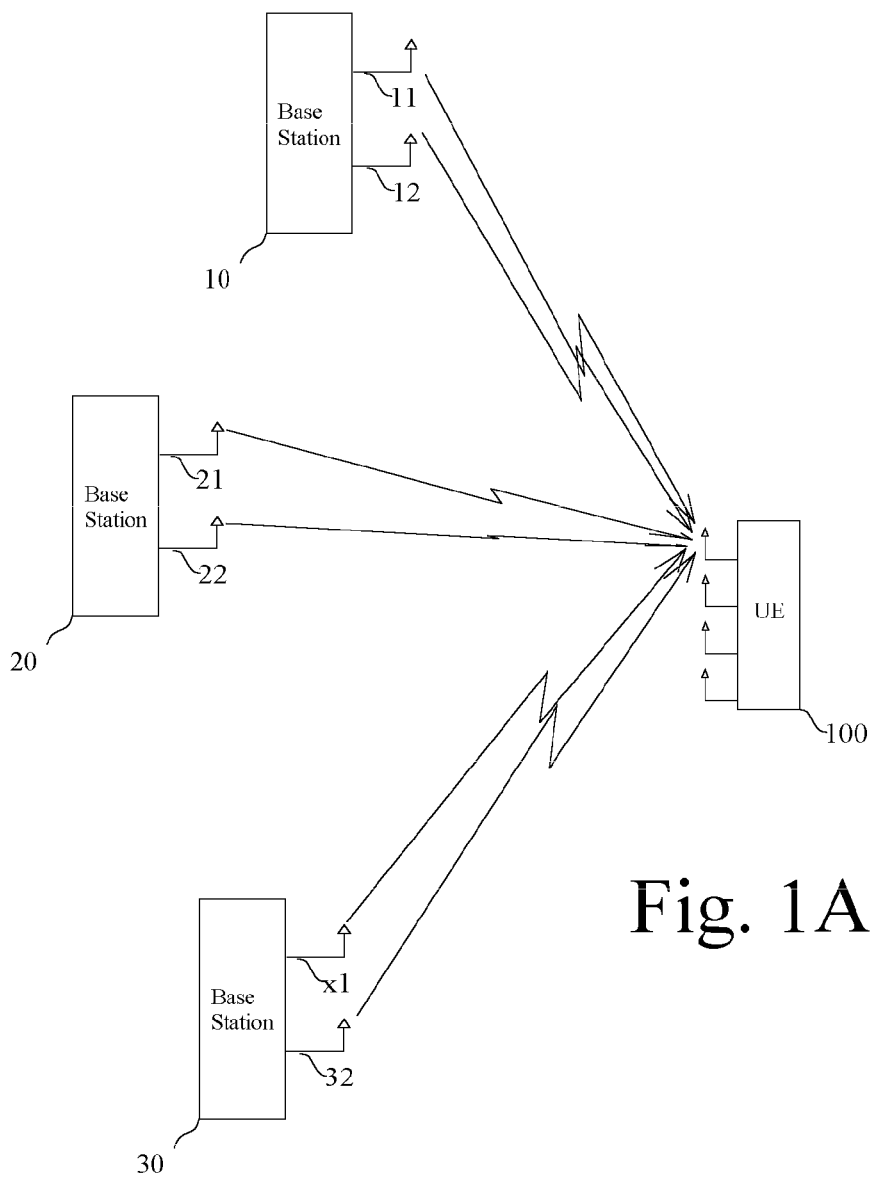
FIG. 1A illustrates one OFDM-MIMO communication system comprising three base stations and one UE.
Figure 1B:
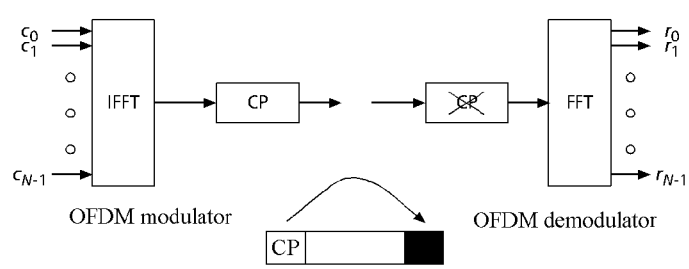
FIG. 1B illustrates the general principle of the OFDM modulation.

With respect to FIG. 1A there is now illustrated the synchronous OFDM system comprising three base stations, respectively 10, 20 and 30, fitted with MIMO capabilities. Base Station 10 is assumed to have two emitting and receiving antennas 11-12, Base Station 20 (resp. 30) has a correspond set of two antennas 21-22 (resp. 31, 32).

On the other side of the communication channel, one User Equipment (UE) 100, which can be a mobile telephone, a laptop computer, a handheld or any communicating device fitted with MIMO capabilities, has four distinctive antennas for instance, each one receiving a composite signal formed of the combination of the six different signals received from antennas 11-12, 21-22, and 31-33.

In the conventional OFDM-MIMO communication between base station 10 and UE 100, one single data stream is split into several partial data streams and transmitted through the different antennas forming the MIMO system of User Equipment 100.

The invention deviates from this known technique in the fact that UE 100 now incorporates more antennas—and corresponding OFDM receivers—so as to achieve, not only the detection of the useful OFDM symbols received from base station 10, but also the interference cancellation of the signals received from the interfering base stations 20 and 30.

Therefore, part of the resources of the MIMO system of the User Equiment—i.e., two antennas—are affected to the communication of the useful data streams, while the remaining part of the resources of the MIMO system—i.e., the two remaining antennas—can be used for interference cancellation of the base stations.

Figure 2:
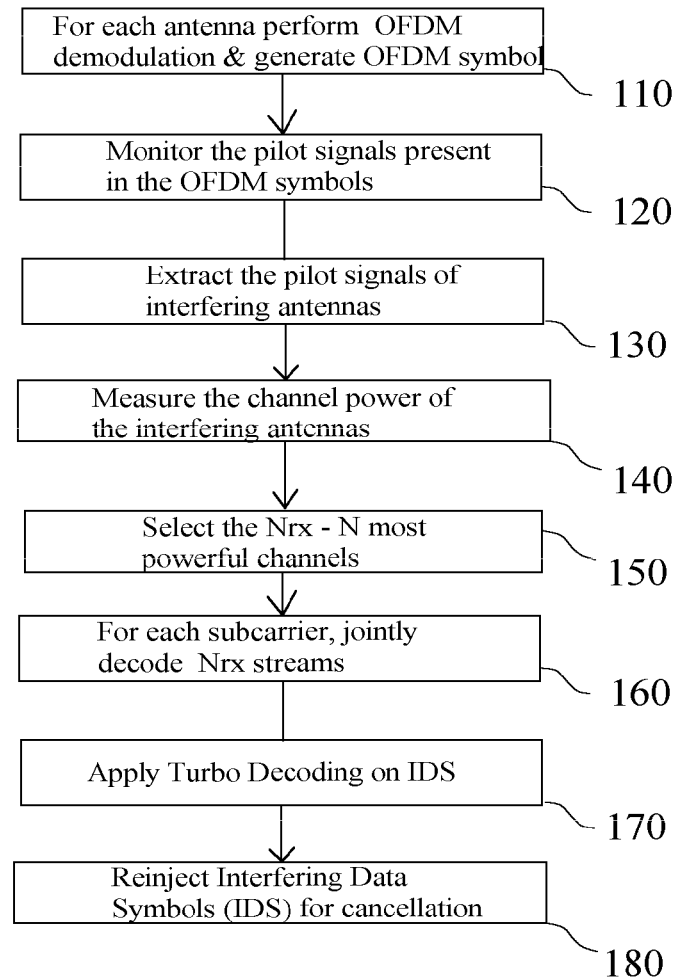
FIG. 2 illustrates the principle of the OFDM modulation and demodulation process with the processing of the guard band or cyclic prefix.

FIG. 2 more particularly illustrates one embodiment of the process of the invention.

It is assumed that the User Equipment is fitted with Nrx antennas, among which N being associated to the communication of useful data for the user. As a consequence, N antennas are dedicated to the OFDM-MIMO modulation while Nrx-N antennas will be assigned to the cancellation of existing interfering antennas.

The process starts with a step 110, wherein there is performed, for each antenna of the User Equipment 100, the OFDM demodulation of the received signal.

In a step 120, the process proceeds with the monitoring, for each antenna of the UE 100, of the pilot signals generated by the different base stations. Such pilot signal may take diverse forms in accordance with the standard and the OFDM modulation being considered. Generally speaking, it is designated as a broadcast pilot channel and, in the particular case of LTE, known under the designation of Reference Signal.

In a step 130, the process extracts the pilot signals and establishes the list of the existing base stations antennas.

Once the complete list of the interfering antennas has been drawn, the process proceeds with a step 140 which measures the channel power of the interfering antennas. The measurement of the channel power is an operation which is well known to a skilled man and will not be further discussed.

Then, in a step 150, the process selects the Nrx-N most powerful channels, where Nrx corresponds to the number of antennas of UE 100 and N the number of antennas for the useful data streams as mentioned above.

Then, in a step 160, for each subcarrier, the process performs, a joint detection of the N Useful Data Symbols (UDS), together with the (Nrx-N) Interfering Data Symbols (IDS) demodulated by the demodulation blocks.

It should be noticed that any joint decoder may be used for that purpose.

In one embodiment, the joint decoder is a so-called Sphere Decoder, but clearly other embodiments may be considered, such as, for instance a simple linear equalizer or the more complex Maximum Likelyhood (ML) decoder.

The key point of the invention is that the joint decoding of the Nrx streams provides, on one hand, the N useful data symbols (UDS) corresponding to the data stream which can be processed in any conventional fashion and forwarded to the upper layer application (wireless communication, Digital TV etc.) and, on the other hand, Nrx-N interfering data symbols (IDS) resulting from the presence of the base stations showing the higher channel power.

The process described above thus achieves an aggregate decoding, by means of the existing MIMO structure, of the N useful data streams and the Nrx-N most disturbing interfering data generated by the interfering Base stations.

The invention embodiments thus basically deviate from the known MIMO technique where the decoder is used for the sole detection of the useful data. With the process which is proposed, a selection is made in the detection process of the interfering signals so as to focus the detection process on the most powerful interfering data.

Figure 5:
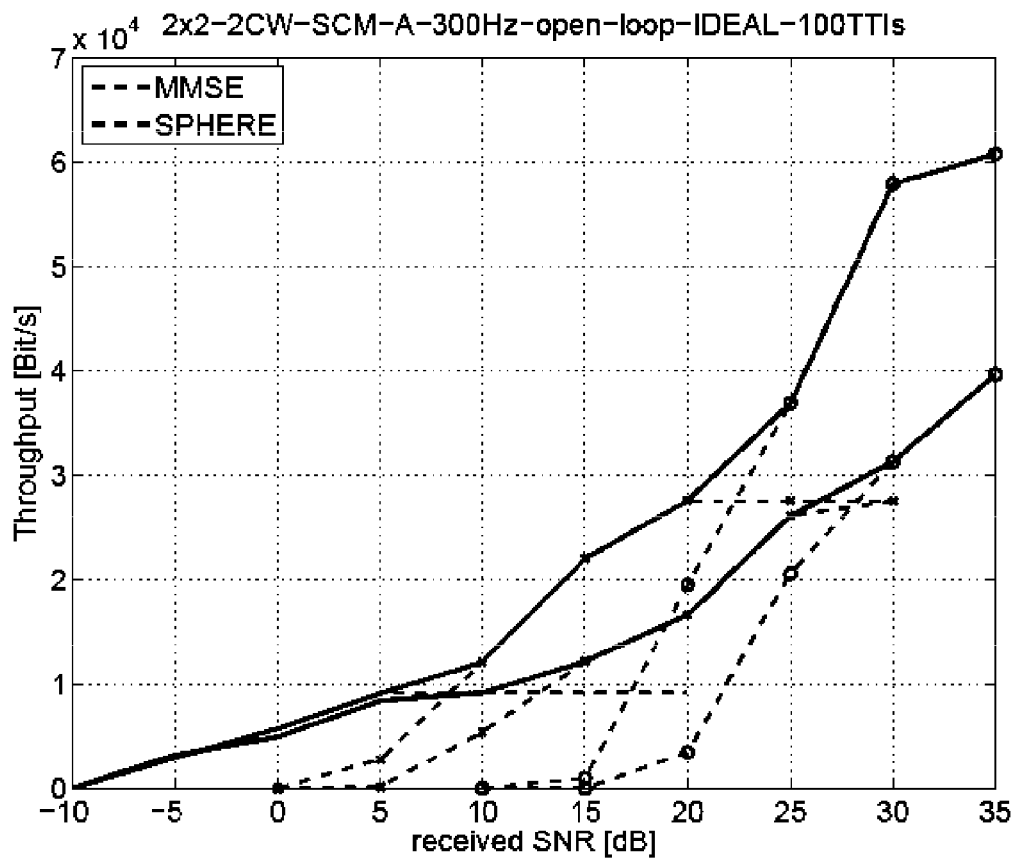
FIG. 5 illustrates another embodiment of an OFDM-MIMO receiving system based on a 4×4 joint decoder with re-encoding of the decoded interfering data symbols.

It has been observed, and this is a very advantageous effect of the invention, that such joint decoding of the useful and interfering data symbols significantly increases the overall performance of the receiver, with a increase of the Signal to Noise Ratio (SNR) which can reach many dB (up to 10 dB), as illustrated in the flow chart of FIG. 5.

Figure 4:
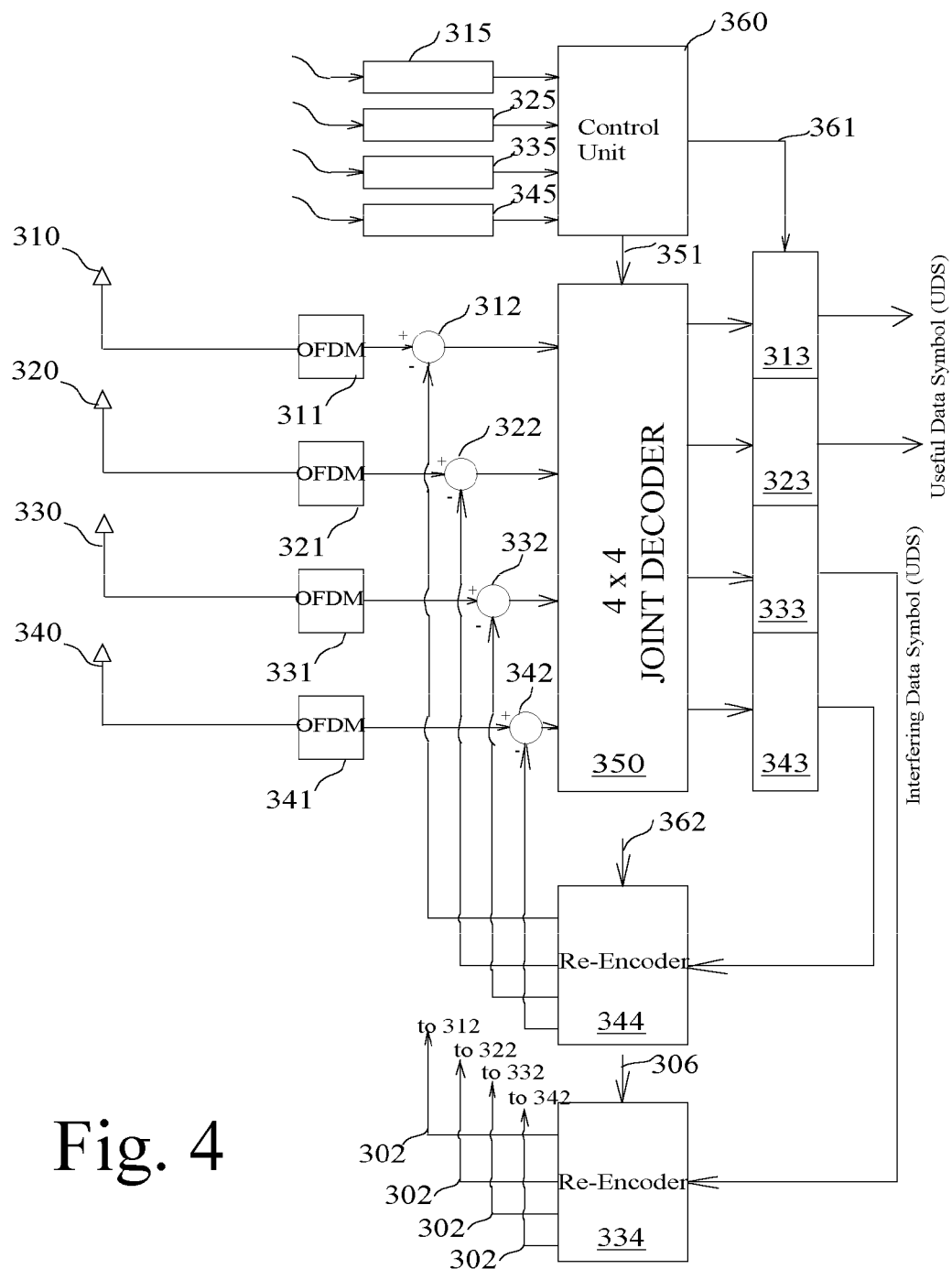
FIG. 4 illustrates one embodiment of an OFDM-MIMO receiving system based on a 2×2 joint decoder.

Steps 170 and 180 of FIG. 4 are optional steps which can be used for still improving the efficiency of the whole process.

For that purpose, IDS which were detected in step 160 are then decoded by means of any convention decoder, such as a turbo decoder for instance, in a step 170.

Then, in a step 180, the decoded interference data Symbol (IDS) is re-injected in the cancellation loop for the purpose of achieving interfering cancellation.

Figure 3:
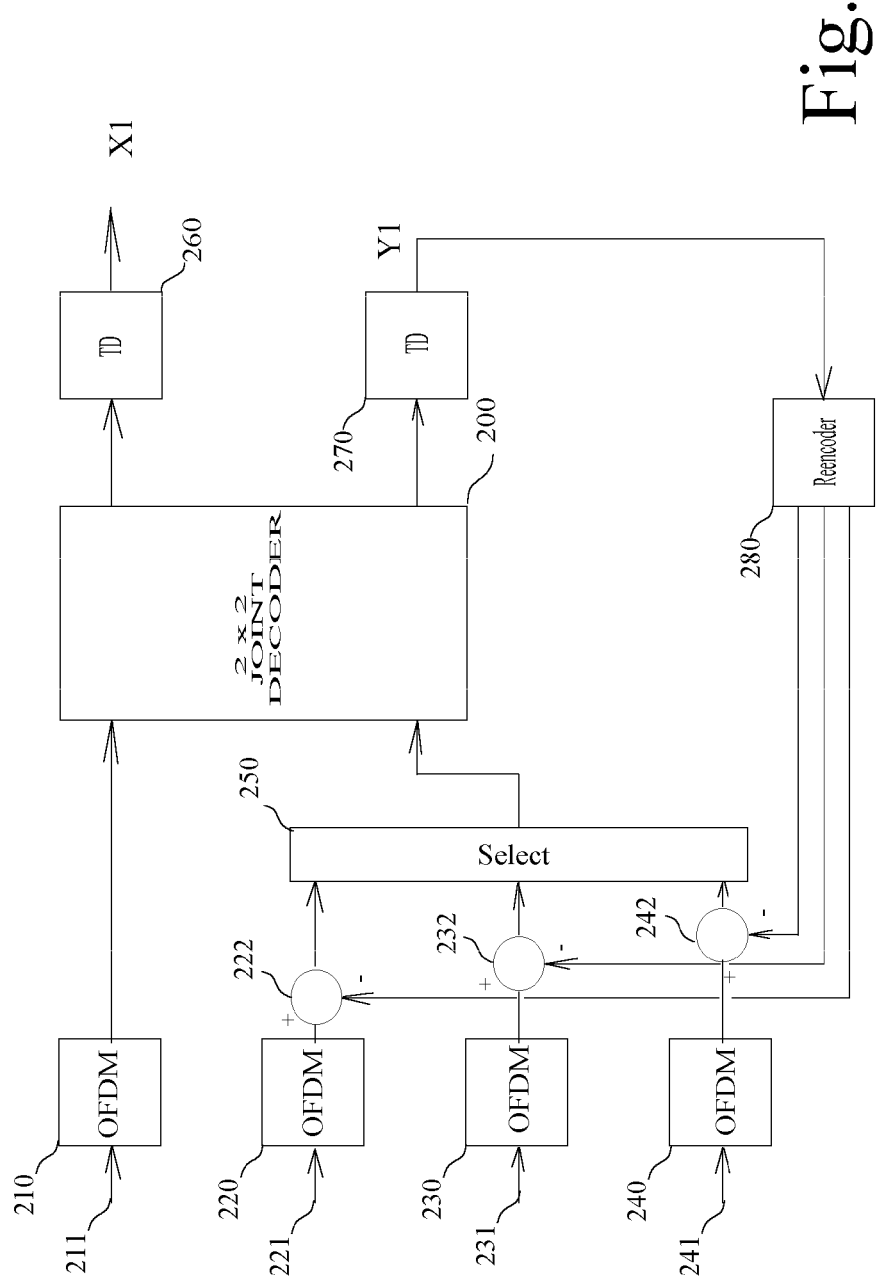
FIG. 3 illustrates one embodiment of the process of the present invention.

It should be noted that the process of joint decoding of Useful Data Symbols (UDS) together with Interfering Data Symbols (IDS) is applicable even in the case of a 2×2 joint decoder, for instance, which is the case illustrated in FIG. 3.

FIG. 3 shows one receiver comprising four OFDM demodulation blocks, respectively 210, 220, 230 and 240 which are used for performing the basic functions of time and frequency synchronization, Cyclic Prefix suppression and IFFT conversion. Block 210 receives via a lead 211 the signal received from the first antenna of UE 100, while block 220 receives via a lead 221 the signal received from the second antenna of UE 100. The signal received from the third antenna (resp. the fourth) of UE 100 is forwarded via a lead 231 (resp. 241) to OFDM block 230 (resp. 240).

A 2×2 joint decoder 200 provides the decoding of two data symbols, comprises two inputs and an output. The first input of joint decoder 200 receives the data symbol forwarded by OFDM demodulator 210 (assumed to receive the useful data symbol) while the second input receives the output of a selector block 250 having three inputs.

Selector block 250 has a first input which receives the output of an adder/subtractor 222, which positive input receives the output of demodulation block 220, and which negative input receives a first output of a re-encoder block 280.

Similarly, selector block 250 has a second input (resp. third input) which receives the output of an adder/subtractor 232 (resp. 242), which positive input receives the output of demodulation block 230 (resp. 240), and the negative input receives the second (resp. the third) output of re-encoder block 280.

Joint decoder 200 has two outputs which generate the data and interfering symbols which are respectively forwarded to two turbo decoders, respectively 260 and 270).

It should be noticed that 2×2 joint decoder achieves the decoding of the two symbols X1 and I1, with X1 being the useful data symbol (UDS) and I1 being the Interfering data Symbol (IDS) corresponding to the particular one among the three interfering signals provided by the three OFDM demodulation blocks 220-230-240 which shows the higher channel power.

By decoding the higher channel power, that is to say symbol X1, the latter can be re-injected into re-encoder 280 so as to compute the OFDM symbol which is then subtracted to adder/subtractor 222-232-242 forming the cancellation loop.

With respect to FIG. 4, there will be now described another embodiment of the invention, based on the use of a 4×4 joint decoder which allows the possibility to jointly decode two streams of Useful Data Symbol (UDS) together with two high power interfering data symbol (IDS). This embodiment is particularly suitable for receiving the two data streams exchanged for base station 10 and also to cancel the interference of the more powerful interfering base station 20, for instance.

The receiver is based on the use of four distinctive OFDM demodulation blocks 311, 312, 313 and 314, respectively receiving the signal from a corresponding antenna, 310, 320, 330 and 340. As above, each OFDM block achieves timing and frequency synchronization, cyclic prefix discard as well as the IFFT transform.

The receiver further includes a 4×4 joint decoder 350, for instance a sphere decoder, for providing the joint decoding of four distinctive OFDM streams, with four inputs and four outputs. Again, any joint decoder can be used, such as a linear equalizer, a serial interference canceller or a ML decoder.

OFDM block 311 has an output which is coupled to a positive input of an adder/subtractor 312 having two negative inputs and an output which is forwarded to a first input of 4×4 joint decoder 350.

OFDM block 321 has an output which is coupled to a positive input of an adder/subtractor 322 having two negative inputs and an output which is forwarded to a second input of 4×4 joint decoder 350.

Similarly, OFDM block 331 has an output which is coupled to a positive input of an adder/subtractor 332 having two negative inputs and an output which is forwarded to a third input of 4×4 joint decoder 350.

At last, OFDM block 341 has an output which is coupled to a positive input of an adder/subtractor 342 having two negative inputs and an output which is forwarded to a fourth input of 4×4 joint decoder 350.

Joint decoder 350 has four outputs which generate the four decoded data streams, respectfully forwarded to four corresponding turbo decoders, 313-323-333 and 343, respectively.

Turbo decoders 313 and 323 are allocated to the decoding of the two useful data streams carried by the UDS symbols, while turbo decoders 333 and 343 are dedicate to decode two interfering Data Symbols (IDS).

In order to achieve efficient interfering cancellation, the two IDS generated by Turbo decoder 333 and 343 are respectively forwarded to two re-encoders, respectively 344 and 334, are used for the purpose of re-generating the OFDM symbols corresponding the interfering signal.

Re-encoder 344 has four outputs which are respectively forwarded to the first negative input of adder/subtractor 312-342, while re-encoder 334 has four outputs which are respectively forwarded to the second negative input of adder/subtractor 312-342.

The receiver further includes four Channel Estimation blocks, 315, 325, 335 and 345 respectively receiving the signal through the four antennas, and which are coupled to a control unit 360 providing the main control signals used for performing the process which was described above.

Control unit 360 achieves control of the 4×4 joint decoder 350 (via control line 351), turbo decoders 313-343 (via control line 361) as well as re-encoder 334 (via line 306) and re-encoder 344 (via line 362).

Control unit 360 particularly achieves the selection process of step 150 of FIG. 2 so as to control 4×4 joint decoder 460 for detecting the two useful data streams with the two most powerful interfering data streams detected by channel estimation blocks 315-345.

Thanks to the re-encoding of the two interfering data symbols (IDS) by re-encoders 334 and 344, the corresponding contributions can be suppressed from the received signals and cancelled before the detected again by Sphere Decoder, or more generally by the 4×4 joint decoder in order to improve the detection process.

It can be seen that the invention is highly useful for using MIMO structure of the UE 100 for the purpose of canceling the interference from the other present base stations or antennas.

The invention claimed is:

1. A process for canceling interference generated by a set interference base stations in a synchronized OFDM communication system that is received in a User Equipment comprising a set of Nrx antennas, the process comprising:
   performing an OFDM demodulation of the received signal from each Nrx antenna of said UE;
   monitoring, on each Nrx antenna of said UE, pilot signals generated by one or more present base stations;
   extracting said pilot signals and establishing a list of existing base station antennas;
   measuring a channel power of one or more interfering antennas of the set of Nrx antennas;
   selecting the Nrx-N antennas receiving the most powerful interfering channels;
   performing a joint detection of N Useful Data Symbol (UDS) streams and (Nrx-N) Interfering Data Symbol (IDS) streams that were demodulated by OFDM demodulation blocks in the User Equipment.

2. The process according to claim 1, further comprising:
   decoding the IDS streams by a joint decoder into decoded IDS symbols;
   reinjecting the decoded IDS symbols in a cancellation loop prior to the joint decoder so as to cancel interference of the Nrx-N most powerful interfering channels.

3. The process according to claim 1, wherein the joint decoder is a sphere decoder.

4. The process according to claim 1, wherein the joint decoder is a linear equalizer.

5. The process according to claim 1, wherein the joint decoder is a maximum likelihood decoder.

6. A receiver for a synchronous OFDM cellular system comprising:
   a set of Nrx OFDM demodulators associated to a set of Nrx antennas, the OFDM demodulators adapted to perform time and frequency synchronization, cyclic prefix discard and IFFT conversion of Nrx data streams;
   channel estimation and controller blocks configured to estimate the channels associated to each of the Nrx data streams received through the set of Nrx antennas and originating from base stations belonging to said OFDM cellular system, the controller block further configured to select N useful data streams and Nrx-N most powerful interfering data streams from the Nrx data streams, the controller block further comprising a control line;
   a joint decoder, being controlled via the control line from the controller block, configured to
   perform joint detection of both the selected N useful data streams and Nrx-N most powerful interference data streams.

7. The receiver according to claim 6, further configured to re-encode symbols in the detected interference data streams so as to in-inject them in an interference cancellation loop.

8. The receiver according to claim 6, wherein the joint decoder is a sphere decoder.

9. The receiver according to claim 6, wherein the joint decoder is a linear equalizer.

10. The receiver according to claim 6, wherein the joint decoder is a maximum likelihood decoder.

11. User equipment for an OFDM cellular system comprising the receiver of claim 6.

12. The user equipment according to claim 11, wherein the user equipment complies with a LTE standard.

* * * * *